United States Patent [19]

Oglevee et al.

[11] Patent Number: 4,858,377
[45] Date of Patent: Aug. 22, 1989

[54] PLANT ORIENTED CONTROL SYSTEM BASED UPON VAPOR PRESSURE DEFICIT DATA

[75] Inventors: James R. Oglevee; Kirk A. Oglevee, both of Connellsville, Pa.

[73] Assignee: OCS, Inc., Connellsville, Pa.

[21] Appl. No.: 919,702

[22] Filed: Oct. 16, 1986

[51] Int. Cl.$^4$ .......................... B01F 3/02; A01G 9/00
[52] U.S. Cl. ........................................ 47/17; 47/48.5; 236/44 C; 165/21
[58] Field of Search ...................... 47/17, 48.5, 75, 58, 47/14; 364/420; 236/44 C; 165/21

[56] References Cited

U.S. PATENT DOCUMENTS

| 4,211,037 | 7/1980 | Green ....................................... 47/62 |
| 4,430,828 | 2/1984 | Oglevee et al. ......................... 47/17 |
| 4,755,942 | 7/1988 | Gardner et al. ..................... 364/420 |

FOREIGN PATENT DOCUMENTS 1017230  5/1983  U.S.S.R. .................................. 47/17

OTHER PUBLICATIONS

"Effect of Different Irrigation Methods and Levels on Greenhouse Muskmelon" by A. Borelli et al., ACTA Horticulturea 58/1977, pp. 129–135.
"Scheduling Irrigations with Computers" by Marvin E. Jensen, Journal of Soil and Water Conversation, pp. 193–195.
"Mist Controller Plus"—Oglevee Computer Systems Operation Manual.
"The Process of Transpiration" by Paul J. Kramer, Water Relations of Plants, Academic Press 1983, pp. 294–297.
"Canopy Temperature as a Crop Water Stress Indicator", R. D. Jackson, S. B. Idso, R. J. Reginato and P. J. Pinter, Jr., Water Resources Research, vol. 17, No. 4, pp. 1133–1138, Aug. 1981.
"Remote-Sensing of Crop Yields Canopy temperature and albedo measurements have been quatitatively correlated with final harvests of wheat", Sherwood B. Idso, Ray D. Jackson, Robert J. Reginato, Science, vol. 196, Apr. 1, 1977, pp. 19–25.
"A Generalization of the Stress-Degree-Day Concept of Yield Prediction to Accommodate a Diversity of Crops", S. B. Idso, R. J. Reginato, J. L. Hatfield, G. K. Walker, R. D. Jackson and P. J. Pinter, Jr., Agricultural Meteorology, 21 (1980), 205–211.

Primary Examiner—Robert A. Hafer
Assistant Examiner—Jeffrey L. Thompson
Attorney, Agent, or Firm—Webb, Burden, Ziesenheim & Webb

[57] ABSTRACT

A system for controlling environmental conditions including irrigation or misting in greenhouses having a plurality of crop beds within one greenhouse enclosure arranged into a plurality of sense zones and a plurality of control zones comprises a plurality of sensors stationed over crop beds within each sense zone comprising an aspirated enclosure and means therein for generating analog electrical signals indicative of web bulb and dry bulb temperatures and also means for generating an analog electrical signal indicative of incident light over the bed of a microcomputer. The microcomputer is programmed with a task for inputting digital data from the input section indicative of web bulb and dry bulb temperatures and for calculating the vapor pressure deficit over each bed and for inputting digital data from the input section indicative of light intensity; a task for measuring a parameter indicative of physiological crop age; a task for establishing a time interval between supply of water based upon the gathered data; and a task for initiating electromechanical action for supplying water to the crop bed.

10 Claims, 3 Drawing Sheets

PLANT ORIENTED CONTROL SYSTEM BASED UPON VAPOR PRESSURE DEFICIT DATA

1. FIELD OF THE INVENTION

This invention pertains to a plant oriented system for controlling environmental conditions in greenhouses.

It relates in part to our U.S. Pat. No. 4,430,828, issued Feb. 14, 1984 and our abandoned U.S. patent application Serial No. 687,737, filed Dec. 31, 1984.

2. BACKGROUND

Automatic closed-loop control of temperature in a greenhouse by regulating heating and ventilation is old in the art. In fact, other factors affecting the growth and health of the crops being grown in the greenhouse have been automatically controlled. However, in the past control has been directed to maintaining the overall greenhouse environment based upon a small number of sensors and traditional control devices such as single thermostats. Thus prior greenhouse control systems have not been plant or crop oriented control systems. They have not addressed the problems of controlling growth and plant health conditions directly at the growing bed or plant level. Unfortunately, the control of the overall greenhouse conditions, while providing adequate plant growth and health conditions at one bed, may not provide the proper conditions at another bed. This may be due to the nonuniformity of a condition, say temperature, throughout the greenhouse or the fact that different beds are planted with different crops or even that different beds planted with the same crop are at different stages in the growing cycle. Prior greenhouse control systems have not provided adequate individualized control of bed areas based upon feedback of temperature, light, and humidity conditions directly over the beds.

Irrigation and/or misting are the application of moisture to the crop or the soil. Irrigation and/or misting of greenhouse crops based upon estimated evapotranspiration has been proposed but the approach has been crudely implemented and/or not crop oriented. See, for example, "Mist Controller Plus" Operations Manual, Oglevee Computer Systems, "Effects of Different Irrigation Methods and Levels on Greenhouse Muskmellon" *ACTA HORTICULTURAE 58 (1977)* and "Scheduling Irrigations with Computers" *Journal of Soil and Water Conservation,* September-October 1969. It has been known in a theoretical way that evapotranspiration is related to vapor pressure across the plant leaf surfaces and certain resistances. See *Water Relations of Plants* by Paul J. Kramer (Academic Press 1983) pp. 294-297. However, applicants are unaware of any attempt to control irrigation or misting in a greenhouse environment by simply accumulating vapor pressure deficit.

SUMMARY OF THE INVENTION

It is an object of one embodiment of this invention to provide a computerized plant oriented control system or method that, as a function of accumulated vapor pressure deficit over the beds and the physiological age of the crops, provides the amount of irrigation necessary to insure healthful propagation and growth of the crop. Vapor pressure deficit is the difference between the measured vapor pressure and the maximum possible vapor pressure at the temperature of the atmopshere over the bed.

It is an object of this invention to provide a computerized plant oriented control system for misting or irrigating greenhouse plants wherein the frequency of moisture application is related to the accumulated vapor pressure deficit and a measure of the physiological age of the crop.

It is an object of this invention to provide a computerized plant oriented control system or method for control of the greenhouse environment including control of irrigation or misting rate and, for example, closed-loop control of temperature, light, and/or carbon dioxide concentration.

It is another object of this invention to provide an automated plant oriented control system or method for programming growth rates by maintaining the irrigation rate and one or more conditions such as temperature and carbon dioxide concentration in the atmosphere over the beds as a function of the available light and/or controlled amount of light incident the crop bed.

It is a feature according to this invention that a greenhouse has a plurality of sensing zones and a plurality of irrigation (or misting) control zones and wherein each sensing zone is provided individualized environmental control based upon its particular needs. The system includes components that collect data such as temperature, light, humidity, wind speed and direction. A central microcomputer unit uses the data obtained to make decisions and act upon them. The microcomputer is programmed with one or more algorithms to make the decisions. The algorithms may be modified depending upon the nature of the crop and the greenhouse system being controlled. The plant oriented control system provides a fully automated greenhouse environment with the ability to monitor and control all applicable conditions.

In its broadest expression, the computerized plant oriented control system comprises structure defining a plurality of sensing zones, structure defining a plurality of irrigation control zones and a microcomputer programmed with algorithms or tasks for maintaining irrigation (or misting) rate and at least one other controllable parameter affecting growth in the control zones to promote the health and growth of the crop or crops. For those embodiments which relate to anticipatory control condition, sensors remote from the bed such as external temperature, wind speed and wind direction sensors are required. The microcomputer must include a real time clock.

As the terms are used herein, a "sense zone" or "sensing zone" is a bed area, preferably not in excess of about 3,000 square feet all planted with the same crop at about the same time having aspirated wet bulb-dry bulb humidity sensor directly over and near the bed. As used herein, various "control zones" include a misting control zone or irrigating control zone and, possibly, a heating control zone, cooling control zone, shade control zone, heat retention control zone, horizontal flow control zone, and carbon dioxide atmosphere control zone. Each control zone has associated with it a controllable device for affecting the environment within the zone. A misting control zone comprises a bed area, usually one sensing zone, having controllable water spray over the bed. An irrigating control zone comprises a bed area, usually one sensing zone, having a controllable bed watering system. A heating control zone comprises a bed area, including at least one sensing zone, that has a controllable heating element associated therewith. A cooling control zone comprises a bed area, including at least one sensing zone, that has a controllable cooling system associated therewith. This may simply be a cross ventilation pathway controlled by one or more vents. A shade control zone comprises a bed area, including at least one sensing zone having a controllable sunscreen or shade associated therewith. The shade control zone might become a heat retention zone at night as radiative cooling can be controlled by the presence or not of the screen or shade over the bed. A horizontal flow control zone is a bed area, including at least one sensing zone, that has a controllable horizontal circulation fan associated therewith to prevent stratification when no ventilation is being used. A carbon dioxide atmosphere control zone comprises a bed area, generally the entire enclosed greenhouse, having means for generating carbon dioxide. It should be noted that the various control zones need not be contiguous but very often are overlapping. (For example, a large greenhouse may have two cooling zones but many heating zones.) Controllable devices associated with the control zones are devices which may be activated, for example, by application of an AC current such as a solenoid control valve or an AC motor controlled by a motor controller which controller provides the function of starting, stopping, and reversing a motor.

As stated above, the microcomputer must be programmed with algorithms or tasks to enable it to make intelligent decisions. According to this invention, there is provided an algorithm for establishing irrigation rate based upon accumulated vapor pressure deficit and a measure of the physiological crop age.

An algorithm or task, at spaced intervals, inputs digitalized wet bulb and dry bulb temperatures for each bed or sense zone. The vapor pressure deficit is calculated from the temperature data. The deficit is accumulated until it reaches a threshold, which is preestablished and which is a function of a measure of the physiological age of the crop. Output control signals actuate controllable devices and thus the crop is irrigated (or misted) to prevent moisture deficiencies. This will be recognized as a semi-open-loop control.

The control is referred to as a semi-open-loop since it is neither a completely closed-loop nor a completely open-loop control scheme. The parameter that applicants seek to control is the amount of moisture in the crop bed and/or over the crop surface. Since, moisture is constantly being removed by evapotranspiration at a rate that varies due to a number of conditions, the rate of application of water to the crop or crop bed (misting or irrigation) should equal the evapotranspiration rate. Applicants have found that while a number of factors are known to affect the evapotranspiration rate, only two need be considered; namely, vapor pressure deficit and physiological crop age (as a measure of leaf area). Since moisture entering the space above the crop will reduce the vapor pressure deficit, the vapor pressure (the measured variable) will be to some degree related to the amount of moisture in the bed and entering the space over the bed. On the other hand, the vapor pressure deficit may be only slightly affected by the moisture entering the space over the bed, where in the winter, moisture is rapidly condensing on greenhouse walls or in summer a strong ventilating breeze from the outside is across the crop bed.

In addition, at least one other parameter affecting growth is preferably provided with a closed-loop control. For example, the average temperature is then compared to a set point, for example, a maximum temperature, a minimum temperature or the dew point. Depending upon the relationship of the average temperature sensed and the set point, the computer will output control signals to adjust the controllable devices such as heating or ventilating equipment to adjust the temperature relative to the set point temperature. Additionally, an algorithm may maintain the temperature and carbon dioxide atmosphere as a function of the available light to provide a desired growth rate and/or to make efficient use of energy.

THE DRAWINGS

Further features and other objects and advantages of this invention will become clear from the following detailed description made with reference to the drawings in which FIG. 1 is a schematic illustrating a greenhouse, sensing zones and control zones according to this invention;

FIG. 2 is a flow chart for a main program useful according to this invention; and FIG. 3 is a flow chart for a subprogram useful for open-loop control of misting or irrigation.

DETAILED DESCRIPTION

For a more complete description of the more general aspects of this invention, we incorporate our U.S. Pat. No. 4,430,828 by reference.

The equipment for the plant oriented control system according to this invention can be considered in three groups based upon their functions. First there are the sensors. These collect greenhouse data such as temperature, humidity, light, and such external conditions as temperature, light, humidity, wind speed and direction. A second group comprises the microcomputer with associated input and output boards. A third group comprises the valves and motors necessary to carry out the actions that bring about a change in the greenhouse environment.

The grower must determine the number of "control zones" he intends to include in his greenhouse. A zone is defined as one part of the total greenhouse of which individual, independent control can be maintained. The type and location of existing equipment within a greenhouse determine the establishment of control zones. Sensing zones and control zones have already been described. Heating and cooling zones need not be related so it is not necessary that they each have the same division. For example, as a practical matter, an acre of greenhouse may have sixteen heating zones but only two cooling zones.

The crops in the adjacent sense zones within the same control zone theoretically might require a controlled condition to be different. However, due to the nature of crop requirements and the usual greenhouse control configurations, this is seldom the case. With some planning of crop placement, the problem can be avoided. For example, most sense zones are coincident with a control zone for heating (for example, hot pipes); misting or irrigating. These are conditions that may vary from crop to crop. On the other hand, ventilation zones usually span a number of sense zones. The ventilation requirement is generally about the same for all crops.

Figure 1:
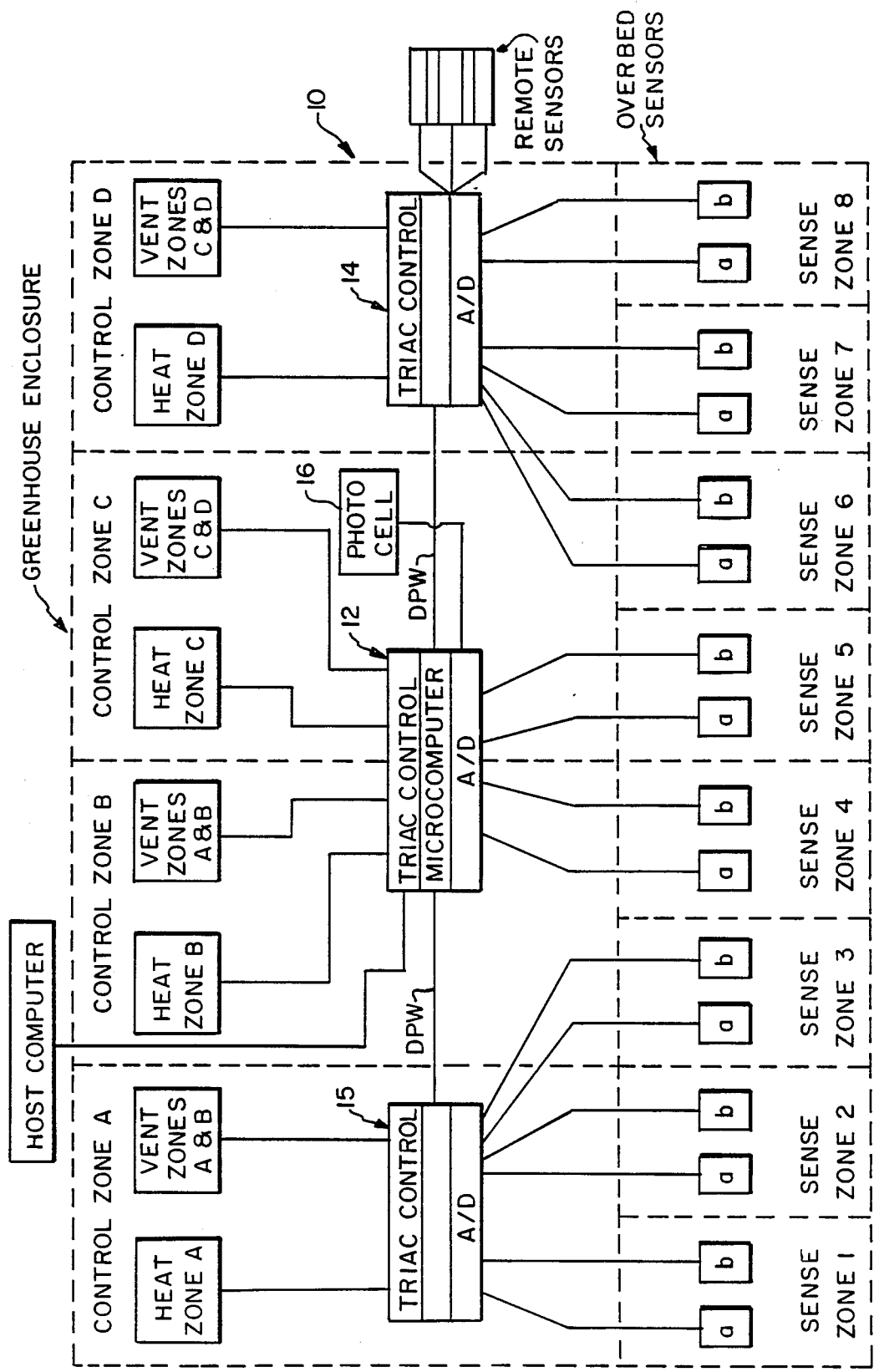

Referring now to FIG. 1, the system hardware according to this invention is shown schematically. The large rectangle represents the greenhouse enclosure 10. Located within the greenhouse is a microcomputer 12 having associated A/D input sections and AC output (control) sections. Two IO stations 14 and 15 are spaced from the microcomputer. The IO stations have associated A/D input sections and AC output sections identical with those directly associated with the microcomputer and, as will be explained, they are functionally equivalent to those directly associated with the microcomputer. All A/D input sections and AC output sections are connected to the microcomputer by one common address-data-control pathway referred to in here as the data pathway (DPW). It is possible that IO stations will be unnecessary in a small greenhouse. In fact, for the number of sense zones illustrated in FIG. 1, the A/D input systems and AC output sections directly housed within the microcomputer would be sufficient. The use of IO stations depends upon the number of sense zones being monitored and the spacing thereof. It is desirable to reduce the length of the sense input wires carrying analog signals and thus the additional IO stations may be required.

The greenhouse of FIG. 1 is divided into eight sensing zones, each having one or two sense stations a, b, over the bed. Sense stations are aspirated enclosures for housing both dry bulb and wet bulb temperature sensors and for generating an analog signal indicative of these temperatures. A light sensing station for generating an analog signal indicative of light intensity over the bed is often associated with the temperature sensing station.

Referring again to FIG. 1, the greenhouse is further divided into a number of control zones. For example, four zones labelled A, B, C, and D have individually controlled heating and/or watering means. The heating means may comprise a number of possible devices, for example, on-off steam heating below the beds, proportional hot-water heating below the beds, infrared heaters above the beds or gas fired unit heaters above the beds. The watering means may comprise pipes that spray a mist over the bed or pipes that deliver water to the beds.

To illustrate that the control zones may overlap, two ventilation control zones are illustrated; one extending to heating control zones A and B and the other to heating control zones C and D. Ventilation may be by opening vents on each side of the greenhouse or by turning on fans that draw air across the ventilation zone. The intake vents may or may not have evaporation coolers associated therewith depending upon the application. Shade zones comprising canvas shades that are drawn horizontally over the beds just below the rafters may be arranged in zones. In the example of FIG. 1, there are two shade zones comprising control zones A and B and control zones C and D. The shades are useful for two purposes: In the daytime, the drawn shades reduce sunlight and temperature of the beds. At night the shades help to maintain temperature over the beds by reducing radiation cooling. Located above the shade is a light sensor 16 enabling the detection of the availability of sunlight when the shade is drawn.

To this point, all of the elements of the system being described are positioned within the greenhouse enclosure. Two groups of optional elements may be positioned external to the greenhouse. An external temperature sensor, wind speed sensor, and wind direction sensor may be provided for anticipatory control as will be explained herein. Also a host computer for downloading new control algorithms or tasks to the microcomputer may be positioned external to the greenhouse.

Plant oriented control systems must gain an adequate amount of information from each zone to be able to make the proper decisions for the correct levels of control. The overbed sensors are housed in aspirated fan boxes. A light sensor must be mounted close to the roof away from shadows. The temperature sensors comprise solid-state dry bulb temperature monitoring devices having a range 0° C. to 120° C. The humidity sensor is a solidstate wet bulb temperature monitoring device. When used in conjunction with the dry bulb described above this provides the ability to calculate the vapor pressure deficit. The light energy sensor measures light intensity in foot candles. Two types of sensors are used. The first provides very precise measurement of light in the range of 0 to 800 foot candles for use with artificial day length control. The second is a general daylight sensor that provides less resolution in a much wider photosynthetic range of 0 to 11,000 foot candles; that is, the range at which actual plant growth occurs. Typically the temperature sensors comprise a heat sensitive diode, say, LM335 with associated calibration potentiometers. They are commercially available calibrated for a 0.32 volt output in ice water and a 10 millivolt per degree Kelvin output.

To provide more efficient control, conditions outside of the greenhouse are also monitored. This enables the plant oriented control system to anticipate the greenhouse needs prior to any internal changes and also aids in conserving energy. A ten-mile per hour wind speed increase increases the heating load approximately fifteen percent.

The microcomputer comprises a microprocessor, RAM memory, ROM memory, a 25-place keypad input and an 80 character display, for example. The computer is enclosed within an air-tight cabinet; preferably protected from both direct sunlight and other temperature extremes. Computers are available at rated operating temperatures between 0° and 70° C. (32° and 158° F.). Operational greenhouses have an internal temperature well within this range.

The sense sections of the microcomputer, whether in the same cabinet or in an IO cabinet spaced therefrom, collects analog data from the above mentioned sensory elements and converts it to a digital signal with an analog to digital signal converter.

Figure 2:
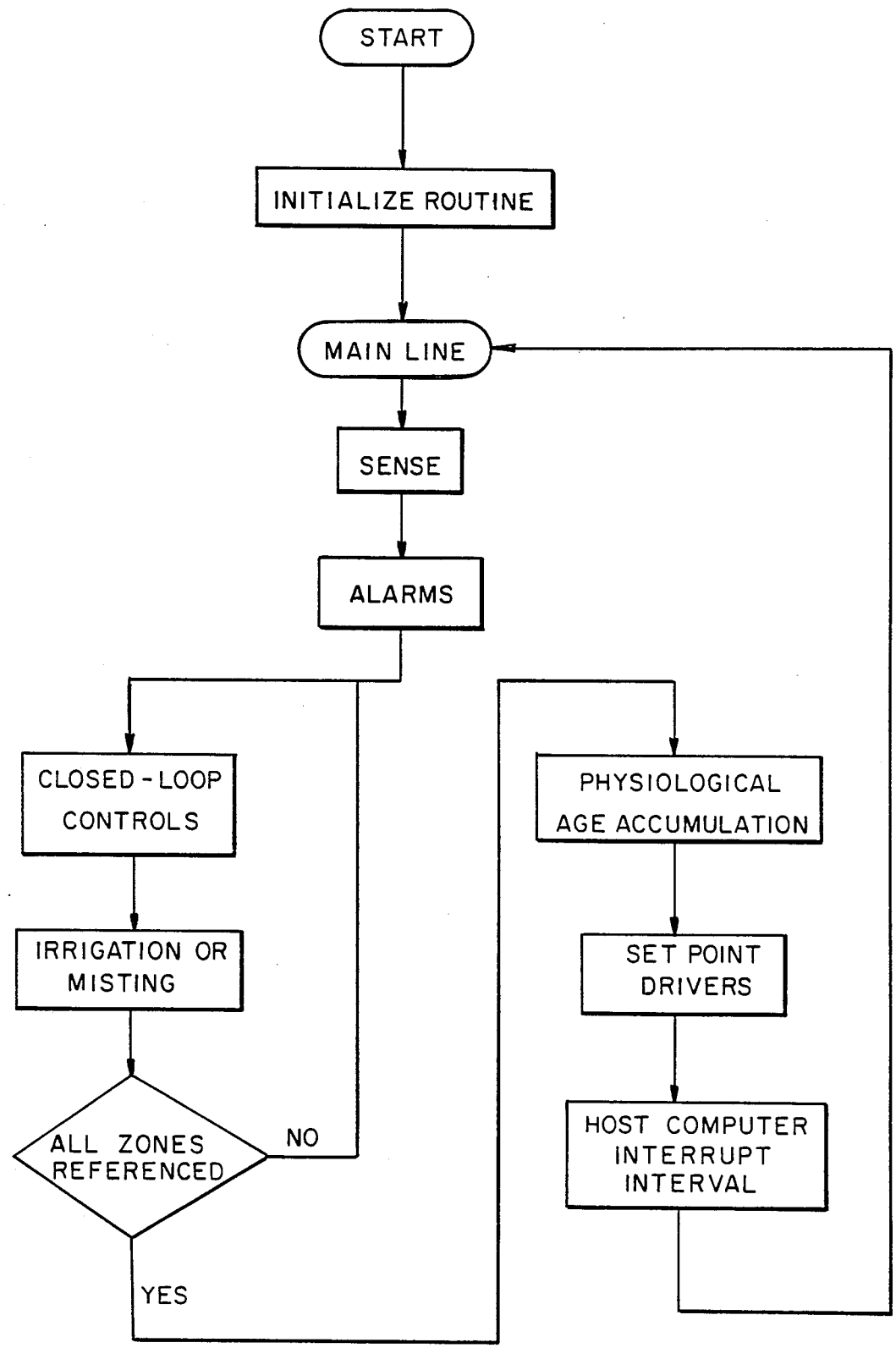

Referring now to FIG. 2, a flow chart for the main program is set forth. The program passes sequentially from an initialization routine through a data gathering procedure and through a temperature adjusting procedure that are repeated for each control zone and thence through a plurality of procedures that are not necessarily zone specific.

After the initialization (programming of ports and clearing of memory areas, etc.) which only takes place upon start-up or reset, the program moves to the main line loop.

The initialization routine also includes direct keyboard or host computer inputs of certain process constants that enable the customization of the system to particular crops.

After initialization the main line of the program is entered. Referring to FIG. 2, the first step in the main line is labeled "sense" and comprises the input of digitized data from all sense zones and preprocessing of the data. (For example, preprocessing may comprise converting wet bulb and dry bulb temperature to vapor pressure deficit. Vapor pressure can be easily calculated from wet and dry bulb temperatures by reference to tables.) The next step, labeled "alarms" is to compare the data to threshold values for which alarms should be activated to call attention to dangerous or potentially catastrophic conditions; for example, loss of heat in the winter months. The next step comprises referring to each control zone and adjusting the controls for that zone. As shown in FIG. 2, the closed-loop controls are first implemented and then the irrigation or misting controls are implemented. When the controls have been implemented in all zones, certain set point driver routines are performed, the physiological age accumulator is updated and the main line is restarted either immediately or following a programmed delay. For a description of the set point drivers reference is made to our above noted patent.

The vapor pressure of water ($P_w$) is a function of dry bulb temperature and may easily be ascertained from tables stored in memory. Also, the partial pressure of water vapor in air ($P_a$) may be easily ascertained from wet bult and dry bulb temperatures and the psychrometric tables, a portion of which are stored in memory. The tables may yield relative humidity $H_R$ for given sets of wet bulb and dry bulb temperatures. The partial pressure ($P_a$) may easily be calculated as $$P_a = \frac{H_R P_w}{100}$$

Vapor pressure deficit ($P_d$) may be calculated as $P_d = P_w - P_a$.

The tables for vapor pressure of water and the psychrometric tables correlating wet bult and dry bulb temperature to selective humidity are widely available in chemical engineering texts and handbooks.

Figure 3:
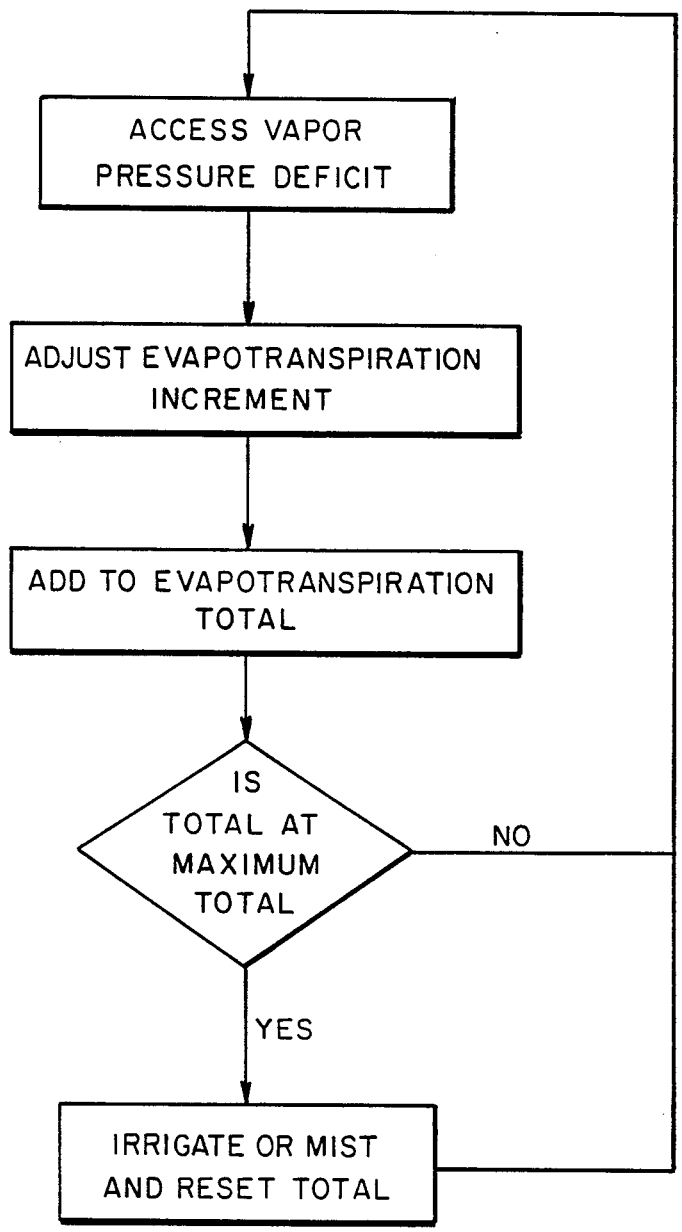

Referring now to FIG. 3, there is shown a subtask for irrigating or misting. The first step is to access the vapor pressure deficit for the zone in question. This data was input in a previous step and stored in a temporary memory location. The data is used to generate an adjusted evapotranspiration increment which is specific to the crop in the zone being considered and the time between program cycles (the length of time between updates). (In other words, the raw vapor pressure deficit data may be multplied by factors that account for the time between program cycles and the particular crop. The shorter the time between program cycles, the smaller the factor. The factors must be developed by simple trial and error.) The addition to the total is then made. At this point, the total (accumulated vapor pressure deficit) is compared to the total required for irrigation or misting (referred to as "maximum total"). If the total exceeds maximum total then irrigation is initiated and the count is reset to zero. This misting or irrigating applies moisture at intervals throughout the day and into the night. Typically, the duration of the period of the mist or irrigation is fixed and the nozzles are adjustable so that the amount of water applied each time is the same. This is consistent with the established greenhouse practices. Misting takes place until an adequate moisture coating exists over the foliage of the crop. Irrigating takes place until a run-off of from 5 to 20 percent is achieved. Again, the volume of water is controlled by the nozzle setting or throttle setting in the water supply.

The frequency misting or irrigating is controlled by vapor pressure deficit and the age of the crop (preferably the physiological age, not the chronological age).

The frequency of the misting is adjusted by adjusting the preselected total ("maximum total") between mistings according to the age of the crop. This can be accomplished in two ways. The crop age may be taken as a chronological age in which case the preselected total is adjusted daily. This procedure for increasing the frequency of misting or irrigation with crop aids is suitable in some applications; however, the frequency should be adjusted according to the crop's physiological age.

A better measure of the physiological age than chronological age is the accumulated light. Means for accumulating light to establish "light days" involves establishing counting rates based upon "incident light intensity." Photocell output is converted to a counting rate. Counts are then accumulated throughout the day until totalling the number of counts assigned to a "light day." The number of "light days" since planting and not the number of chronological days is used as a measure of physiological age. The counting and accumulating of light is performed by computer at the time as indicated, for example, on FIG. 2.

It should be understood that the maintenance of the proper mist (in the case of unrooted cuttings) or the proper irrigation (in the case of rooted crops) is necessary to prevent environmental moisture deficiencies. Should there be a deficiency, the growth rate is reduced. It should also be understood that excessive misting or irrigation can result in damage to the crop through leaching. Even a slight excess can result in reduction of the growth rate due to leaching of nutrients from the crop.

As used in the following claims, watering refers to either irrigating or misting.

Having thus described the invention in the detail and particularity required by the Patent Laws, what is desired protected by Letters Patent is set forth in the following claims.

We claim:

1. A plant oriented method of automatically supplying water to a crop bed in a greenhouse comprising the steps for:
   (a) continuously gathering vapor pressure deficit data over the crop bed at spaced time intervals and integrating said data;
   (b) measuring a time parameter indicative of physiological crop age and leaf area;
   (c) establishing an interval between supply of water based upon the data gathered in steps (a) and (b) by integrating said vapor pressure deficit data until a function thereof reaches a threshold at which time a water supply event takes place, said function and/or threshold being adjusted with increase in the parameter indicative of physiological crop age and leaf area to increase the frequency at which the threshold is reached for a given value of integrated vapor pressure deficit data; and
   (d) controllably watering said crop bed based upon the interval established in step (c).

2. The method according to claim 1 wherein the parameter indicative of physiological age is a function of the accumulated light intensity as measured by a photocell and clock.

3. The method according to claim 2 wherein the light intensity is measured with a photocell directly above the bed and vapor pressure deficit is determined from wet and dry bulb temperature sensors which are located in an aspirated housing directly over the bed.

4. The method according to claim 3 wherein the algorithm for establishing the supply interval comprises at spaced intervals calculating the vapor pressure deficit from the wet bulb and dry bulb temperature and stored psychrometric data and totaling said data and establishing the maximum total amount of water required for supply as a function of units of physiological age, the value of which function generally decreases with increasing age.

5. A method according to claim 4 wherein the water is supplied to cover the leaf surface of the crop as a mist.

6. The method according to claim 4 wherein the water is supplied to the crop bed in an amount that provides a small amount of run-off.

7. A plant oriented automatic method for controlling the environment of a crop bed in a greenhouse comprising the steps for:

(a) continuously gathering vapor pressure deficit data over the crop bed at spaced time intervals and integrating said data;
(b) measuring a time parameter indicative of physiological crop age and leaf area;
(c) closed-loop control of at least one parameter selected from the group temperature, $CO_2$, shade, and ventilation; and
(d) simultaneous semi-open loop control of supplying water to the crop bed at intervals which are adjusted according to the integrated vapor pressure deficit data and the measured time parameter of physiological crop age.

8. A method according to claim 7 wherein the control in step (a) is designed to promote growth at a desired rate.

9. The method according to claim 7 wherein the control in step (b) is designed to prevent moisture deficiencies.

10. A method according to claim 8 wherein the control in step (b) is designed to increase growth rate and decrease energy usage.

* * * * *